(12) United States Patent
Sporrer et al.

(10) Patent No.: US 9,723,776 B2
(45) Date of Patent: Aug. 8, 2017

(54) AGRICULTURAL IMPLEMENT AND ATTACHMENT WITH DOWN PRESSURE CONTROL SYSTEM

(71) Applicant: DEERE & COMPANY, Moline, IL (US)

(72) Inventors: Adam D. Sporrer, Ames, IA (US); Thomas J. Rosin, Ankeny, IA (US); Robert T. Casper, Mingo, IA (US); Luc Janelle, Ankeny, IA (US); Bryan D. Blauwet, Ankeny, IA (US); Jeremy Nefzger, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 95 days.

(21) Appl. No.: 14/459,967

(22) Filed: Aug. 14, 2014

(65) Prior Publication Data

US 2016/0044857 A1    Feb. 18, 2016

(51) Int. Cl.
*A01B 63/32*    (2006.01)
*A01B 29/04*    (2006.01)

(52) U.S. Cl.
CPC .......... *A01B 63/32* (2013.01); *A01B 29/048* (2013.01)

(58) Field of Classification Search
CPC ....... A01B 5/04; A01B 29/048; A01B 63/008; A01B 63/32
See application file for complete search history.

(56) References Cited

U.S. PATENT DOCUMENTS

| | | | | | |
|---|---|---|---|---|---|
| 2,721,405 | A | * | 10/1955 | Gardner | E01C 19/27 172/292 |
| 3,090,447 | A | * | 5/1963 | Hotchkiss, Jr. | A01B 21/08 172/178 |
| 4,269,535 | A | * | 5/1981 | Schultz | E02D 3/026 172/177 |
| 4,858,698 | A | * | 8/1989 | Williamson | A01B 63/1145 172/439 |
| 5,065,681 | A | * | 11/1991 | Hadley | A01B 63/114 111/55 |
| 5,161,622 | A | * | 11/1992 | Godbersen | A01B 49/02 172/140 |
| 5,687,798 | A | * | 11/1997 | Henry | A01C 7/205 172/311 |
| 6,302,220 | B1 | * | 10/2001 | Mayerle | A01B 63/32 172/459 |

(Continued)

OTHER PUBLICATIONS

Great Plains Mfg. Inc., 1700TT Turbo-Till Manual, Copyright 2006.

*Primary Examiner* — Robert Pezzuto
*Assistant Examiner* — Adam Behrens
(74) *Attorney, Agent, or Firm* — Taft Stettinius & Hollister LLP; Stephen F. Rost

(57) ABSTRACT

An agricultural implement and attachment are described for soil conditioning. The implement may include an implement frame, with the attachment configured to be towed by the implement frame. A pressurized fluid circuit may be configured to control one or more actuators, in order to provide lifting or lowering force to the attachment. The attachment may include a leading frame and a trailing frame, each configured to support a set of agricultural tools. The trailing frame may be mounted to the implement frame via the leading frame.

12 Claims, 7 Drawing Sheets

(56) References Cited

U.S. PATENT DOCUMENTS

| | | | | |
|---|---|---|---|---|
| 6,389,999 B1* | 5/2002 | Duello | A01C 5/064 | 111/200 |
| 6,681,868 B2* | 1/2004 | Kovach | A01B 13/08 | 172/146 |
| 6,763,896 B1* | 7/2004 | Hurtis | A01B 29/048 | 172/144 |
| 7,017,675 B2* | 3/2006 | Ankenman | A01B 49/02 | 172/142 |
| 7,766,093 B2* | 8/2010 | Becker | A01B 63/32 | 172/133 |
| 8,074,729 B2* | 12/2011 | Kovach | A01B 49/02 | 172/170 |
| 8,380,356 B1* | 2/2013 | Zielke | A01C 7/205 | 111/34 |
| 8,522,889 B2* | 9/2013 | Adams | A01C 7/203 | 111/136 |
| 8,573,111 B2* | 11/2013 | Graham | A01B 63/1013 | 60/445 |
| 8,887,824 B1* | 11/2014 | Johnson | A01B 33/024 | 172/146 |
| 2004/0144550 A1* | 7/2004 | Hurtis | A01B 49/027 | 172/147 |
| 2007/0022926 A1* | 2/2007 | Flikkema | A01C 7/205 | 111/62 |
| 2007/0039746 A1* | 2/2007 | Bettin | A01C 7/205 | 172/776 |
| 2011/0253239 A1* | 10/2011 | Graham | A01B 63/1013 | 137/613 |
| 2011/0284253 A1* | 11/2011 | Stevenson | A01B 49/027 | 172/311 |
| 2012/0048160 A1* | 3/2012 | Adams | A01C 7/203 | 111/163 |
| 2012/0151910 A1* | 6/2012 | Sauder | F15B 11/042 | 60/459 |
| 2012/0186503 A1* | 7/2012 | Sauder | A01C 7/205 | 111/134 |
| 2012/0316673 A1* | 12/2012 | Riffel | A01C 7/102 | 700/240 |
| 2013/0032363 A1* | 2/2013 | Curry | A01C 7/205 | 172/4 |
| 2013/0199807 A1* | 8/2013 | Hoffman | A01B 49/027 | 172/1 |
| 2013/0206431 A1* | 8/2013 | Freed | A01B 49/027 | 172/1 |
| 2014/0158386 A1* | 6/2014 | Payne | A01B 73/042 | 172/178 |

* cited by examiner

AGRICULTURAL IMPLEMENT AND ATTACHMENT WITH DOWN PRESSURE CONTROL SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural implements such as tillage implements and related attachments, including down pressure and finishing systems for tillage implements.

BACKGROUND OF THE DISCLOSURE

In order to appropriately condition a field after harvesting, before planting, or at other times, various agricultural implements may be utilized. For tillage operations, for example, a tillage implement may be towed across a field behind a work vehicle (e.g., behind a tractor). The tillage implement may include a rigid main frame, which may be configured to support various tools and attachments for conditioning the soil of the field. In certain embodiments, for example, a tillage implement may support disk gangs, rippers, finishing baskets, and so on.

Tools for tillage (and other operations) may sometimes be configured for particular tasks. For example, certain disk gangs may be configured for opening soil furrows or trenches or for cutting and chopping plant material and other residue. In some implements, various gangs of mulching disks may be disposed on rigid wings attached near the front or middle of a tillage implement. Other disk gangs may be configured to close furrows or trenches or otherwise finish the soil. For example, various gangs of finishing disks (or other finishing disk assemblies) may be disposed near the back of a tillage implement. Other closing or finishing devices may also be utilized. For example, a rolling basket may be disposed near the back of a tillage implement in order to smooth mounds left by other tools (e.g., finishing disks), break up remaining clods of soil, and so on.

In order to effect appropriate conditioning of a given field (or other operations), it may be useful to provide appropriate down pressure to various tools supported by an implement (or to support structures for those tools), such that the tools appropriately engage the ground. In certain embodiments, the weight of the relevant implement (or attachment) may be sufficiently large to provide appropriate down pressure to the tools. For example, in certain conditions, the weight of the main frame of a tillage implement may be sufficient to ensure that tools mounted to the frame maintain appropriate contact with the soil. Where tools are mounted to a pivoting wing, however, or other moveable attachment, the weight of the wing or other attachment may not always be sufficient to ensure appropriate engagement of the tools. For example, where a rigid wing is configured to fold upward for transport, impacts by the ground on tools attached to the wing may tend to bounce the wing upward such that the tools do not effectively engage the soil. Similarly, trailing attachments, which may be pivotally attached to a main frame of a tillage implement in order to support various finishing (or other) tools, may be insufficiently heavy to maintain appropriate ground engagement of the relevant tools. For these and other reasons, it may be useful to provide a system for improved down pressure control and soil conditioning.

SUMMARY OF THE DISCLOSURE

An agricultural implement and related attachment is disclosed for applying down pressure at various tools, including for the conditioning of soil.

According to one aspect of the disclosure, an agricultural implement may include a main frame, and a trailing attachment may be configured to be towed by the main frame. A pressurized fluid circuit may be configured to provide lifting or lowering force to the trailing attachment. The trailing attachment may include a leading frame and a trailing frame, each configured to support a set of agricultural tools. The trailing frame may be attached to the main frame via the leading frame, such that the trailing frame trails behind the leading frame when the agricultural implement travels in a forward direction.

In certain embodiments, the agricultural tools may include closing disk assemblies or finishing baskets. A first attachment structure for attaching the leading frame to the main frame may be aligned along a forward direction of travel, when viewed from above, with a second attachment structure for attaching the trailing frame to the leading frame.

In certain embodiments, the pressurized fluid circuit may include a cylinder configured to move the leading frame relative to the main frame or to move the trailing frame relative to the leading frame. A pressure control assembly included in the pressurized fluid circuit may be configured to maintain a substantially constant pressure at the cylinder, such that substantially constant down pressure is provided at the leading frame or the trailing frame. The pressure control assembly may include one or more pressure control valves, one-way valves, or one-way valves.

In certain embodiments, a rigid wing supporting a set of agricultural tools may be pivotally attached to main frame. The pressurized fluid circuit may include a wing cylinder attached to the rigid wing and the main frame and a pressure control assembly configured to maintain a substantially constant pressure at the wing cylinder such that substantially constant down pressure is provided at the rigid wing. The pressure control assembly may include one or more pressure control valves, one-way valves, or one-way valves.

According to another aspect of the disclosure, a finishing attachment for a soil-conditioning implement may include a leading frame supporting a first finishing device, and a leading linkage attaching the leading frame to the implement. A pressurized fluid circuit may be configured to control an actuator to move the leading frame with respect to the implement, in order to apply down pressure at the first finishing device. The finishing attachment may further include a trailing frame supporting a second finishing device, and a trailing linkage attaching the trailing frame to the leading frame.

According to another aspect of the disclosure, an agricultural implement is configured for travel in a forward direction over a field during operation. The implement may include a main frame, an attachment supported by the main frame, and a set of agricultural tools supported by the attachment. An actuator may be configured to provide lifting or lowering force to the attachment using pressurized fluid from a pressure source. A pressure control assembly may be disposed between the pressure source and the actuator and may include a pressure control valve configured to maintain a substantially constant pressure at the actuator when pressurized fluid is provided to the pressure control assembly by the pressure source. The pressure source may be configured to constantly provide pressurized fluid to the pressure control valve during operation of the agricultural implement.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
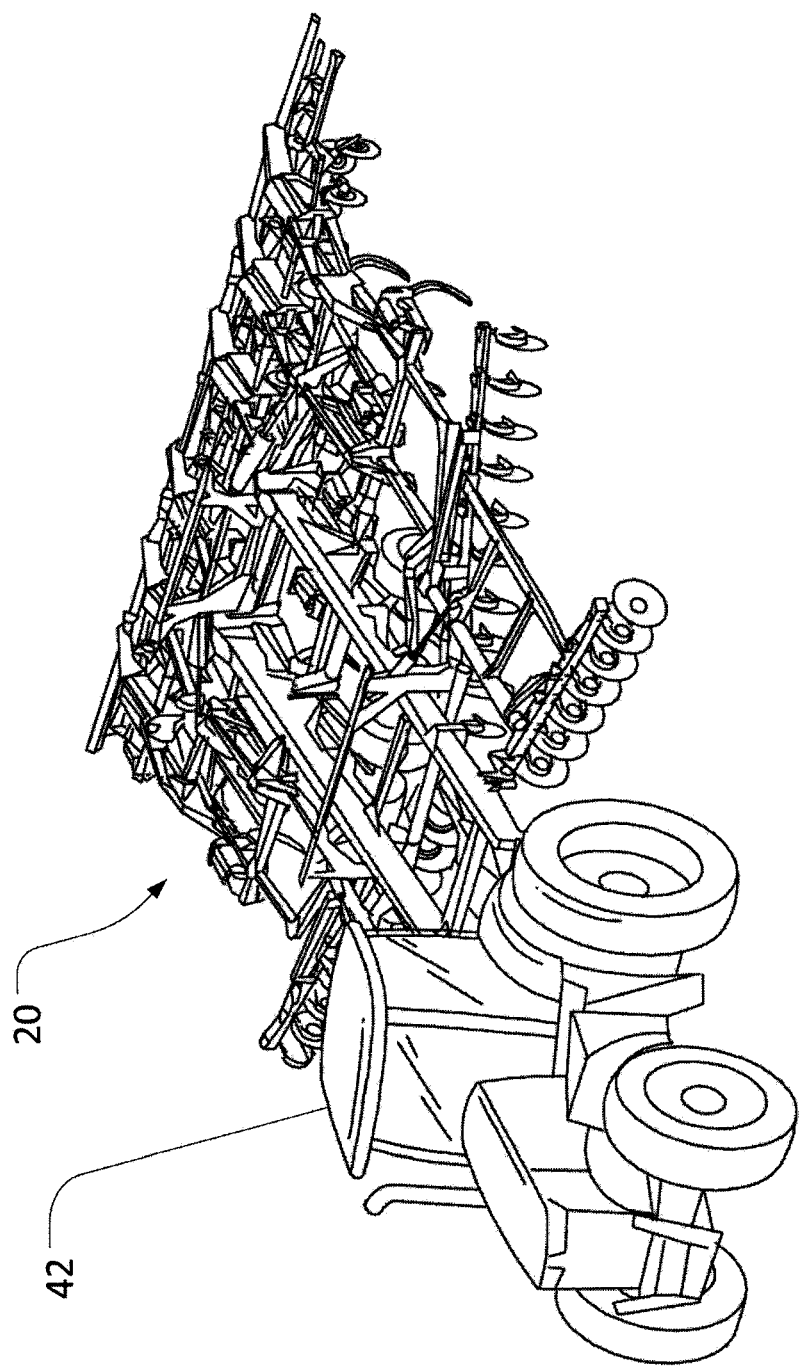
FIG. 1 is a perspective view of an example agricultural implement being towed by a work vehicle.

The following describes one or more example implementations of the disclosed system, as shown in the accompanying figures of the drawings described briefly above.

As noted above, it may be useful to provide a system to control the engagement of various conditioning tools with the soil of a field. Such a system, for example, may usefully control the amount of down pressure that is applied to certain tools, in order to ensure that the tools appropriately engage with the ground. Such a system may also, for example, allow for relatively precise control of various different tools, such as finishing disks, finishing baskets, mulching disks, and so on.

In certain embodiments, the disclosed system may include various pressurized fluid circuits (e.g., hydraulic or pneumatic circuits) for control of down pressure on various tools. For example, for an agricultural implement having attachments configured as rigid wings, various hydraulic (or pneumatic) cylinders may be disposed in communication with (e.g., as part of) a hydraulic (or pneumatic) circuit, such that the circuit may be utilized to provide pressurized fluid to actuate the cylinders. The cylinders may be attached at one end to a main frame of the implement and at another end to one of the rigid wings. Accordingly, the cylinders may be utilized to provide appropriate down pressure to the wings, such that ground impacts and other events do not excessively displace tools supported by the wings. Similarly, in certain embodiments, various cylinders may be disposed to apply down pressure to one or more trailing attachments of an agricultural implement (i.e., attachments configure to be towed by, or otherwise trail behind, the implement).

In certain embodiments, a pressurized fluid circuit for actuating down pressure cylinders (e.g., as discussed above) may include a pressure control assembly disposed between a pressure source (e.g., a hydraulic pump) and the cylinders. Such an assembly may be usefully configured to provide a constant pressure at the relevant cylinders, and thereby a constant down-pressure at the relevant tools. In certain embodiments, a pressure control assembly may include a pressure control valve (e.g., configured as a pressure-reducing valve) disposed between a pressure source (e.g., a pump) and the relevant cylinder. During operation of the relevant implement, the pressure source may constantly provide pressurized flow to the cylinder via the pressure control valve in order to maintain appropriate down pressure on the associated tools. In the event that an impact or other event results in excessive pressure at the cylinder, the pressure control valve may then relieve pressure from the cylinder (e.g., to tank for hydraulic systems, or to atmosphere for pneumatic systems). In this way, substantially constant down pressure may be maintained at the tools, without substantial risk of over-pressure damage to various components.

As noted above, in various embodiments configuration, the pressure source may be configured to operate continuously during operation of the implement. In certain embodiments, an open-center control valve may be included in the relevant fluid circuit, such that fluid may flow, as a default, from the pressure source to the relevant pressure control assembly and cylinder, whenever the pressure source is operating. Actuation of the open-center control valve (e.g., by operator input) may then be utilized to regulate the pressurized flow as appropriate (e.g., to use cylinders to raise a pivoting wing for transport, rather than to apply down pressure thereto). Notably, where the pressure source is already operating to support other functionality (e.g., other pressurized systems on an implement or a towing vehicle), the additional energy cost for this continuous pressurization of down pressure cylinders may be relatively small.

In certain embodiments, other devices may additionally (or alternatively) be included in a relevant pressure control assembly. For example, a pressure relief valve may be disposed along a flow line between opposite ends of one or more cylinders, such that excessive pressure at one end of a cylinder may be vented through the pressure relief valve to the opposite end of the cylinder. This may further contribute to the appropriate application of down pressure at the finishing attachment by compensating for impacts or other events that may tend to over-pressure one side of a cylinder. Various one-way valves (e.g., check valves, bypass valves, and so on) may also be utilized as part of a pressure control assembly.

The structural configuration of various attachments for an implement may also usefully facilitate control of down pressure for soil conditioning. In certain embodiments, for example, a finishing (or other) attachment may be configured to attach at the rear of an implement (e.g., at the rear of a main frame of the implement) such that the attachment trails behind the implement as the attachment is towed by the implement across a field. In certain embodiments, such an attachment may include a stepped or tiered configuration, in which a leading portion of the attachment is attached to the implement (e.g., to a main frame of the implement), a trailing portion of the attachment is attached to the implement via the leading portion. Where the leading and trailing portions of such an attachment are configured to move relatively independently (e.g., to move somewhat independently up or down with respect to the ground), this tiered arrangement may usefully improve down pressure control at the attachment, tracking of the ground by tools supported by the attachment, and soil finishing in general.

In certain embodiments, for example, a trailing (e.g., finishing) attachment may include at least a leading frame and a trailing frame, each supporting a different set of finishing (or other) tools. The leading frame may be pivotally attached to a main frame of the implement, and the trailing frame may be pivotally attached to the leading frame. In this way, movement of the leading frame may cause similar movement of the trailing frame, but the trailing frame may also move relatively independently of the leading frame. As noted above, this may further contribute to appropriate engagement of the ground by the tools of each frame. For example, where the tools of the leading frame encounter an obstacle but the tools of the trailing frame do not, the leading frame may move upward to clear the obstacle, without significantly reducing the engagement of the tools of the trailing attachment with the ground. Similarly, where the tools of the trailing frame encounter an obstacle but the tools of the leading frame do not, the trailing frame may move upward to clear the obstacle, without significantly reducing the engagement of the tools of the leading attachment with the ground.

Various attachment structures may be utilized to attach the various frames of an attachment to an implement. For example, a leading frame may be attached to a main frame of a relevant implement with a four-bar (or other) parallel linkage, such that the leading frame may be moved up and down, with respect to the implement, along a relatively straight path. Similarly, a trailing frame may be attached to the leading frame with a drawbar or other rigid bar, such that the trailing frame pivots along a arcuate path with respect to the leading frame. In certain embodiments, other attachment structures may alternatively (or additionally) be utilized for either of the leading and trailing frames, including parallel linkage or drawbar, including various linkages of one or more bars, or other structural arrangements.

In certain embodiments, attachment structures for attaching the leading frame to the main frame of the implement may be substantially aligned, along a forward direction of travel, with attachment structures for attaching the trailing frame to the leading frame. As noted above, for example, a parallel linkage may be utilized to attach the leading frame of a trailing attachment to the main frame of a implement, and a single-piece drawbar may be utilized to attach the trailing frame of the trailing attachment to the leading frame. In certain embodiments, the main frame of the implement and the leading and trailing frames of the attachment, as well as the parallel linkage and drawbar, may be configured such that the linkage and drawbar, as viewed from above, extend along a common line in the forward direction of travel. This may usefully align the transmission of motive forces from the implement through the leading attachment structure to the leading frame, and through the trailing attachment structure to the trailing frame, and thereby eliminate unwanted moments and other stresses from the system. This may also usefully allow for the use of less structural material than may be necessary, for example, if a trailing frame is to be attached by an attachment structure directly to the implement.

As noted above, various types of pressurized fluid systems may be utilized. In certain embodiments, hydraulic systems may be utilized. This may be useful, for example, in order to take advantage of existing hydraulic circuits and machines on an implement. For example, where a hydraulic pump (i.e., a hydraulic pressure source) and other hydraulic devices (e.g., flow lines, control valves and so on) are already being utilized to operate various other systems for an implement, a down pressure system as described above may usefully utilize such a pump (and other devices). In certain embodiments, pneumatic systems may be utilized. For example, a pneumatic tank may operate as the relevant pressure source, with various pneumatic lines, valves, cylinders, and so on, providing the down-pressure functionality discussed above. In certain embodiments, the use of pneumatic systems may usefully facilitate relatively independent control of down pressure for various portions of an implement. It will be understood, for example, that modern implements may utilize attachments (e.g., wings or trialing attachments) that extend over a substantial distance (e.g., 50 feet or more) and may accordingly be divided in to various sections. Due to the large width of field covered by such an attachment, the appropriate down pressure for one section of an attachment (e.g., a extreme left or right side of the attachment) may differ from the appropriate down pressure for another section of the attachment (e.g., a central section of the attachment). Because pneumatic systems may often be vented to atmosphere, rather than to a tank or reservoir, separate pneumatic circuits may be readily utilized for each of various sections of an attachment (e.g., for each of two side portions and a central portion), such that different down pressure may be applied at different locations on the attachment (e.g., at each of the different sections). (It will be understood that hydraulic (and other) systems may also be utilized for such sectional control.)

Figure 2:
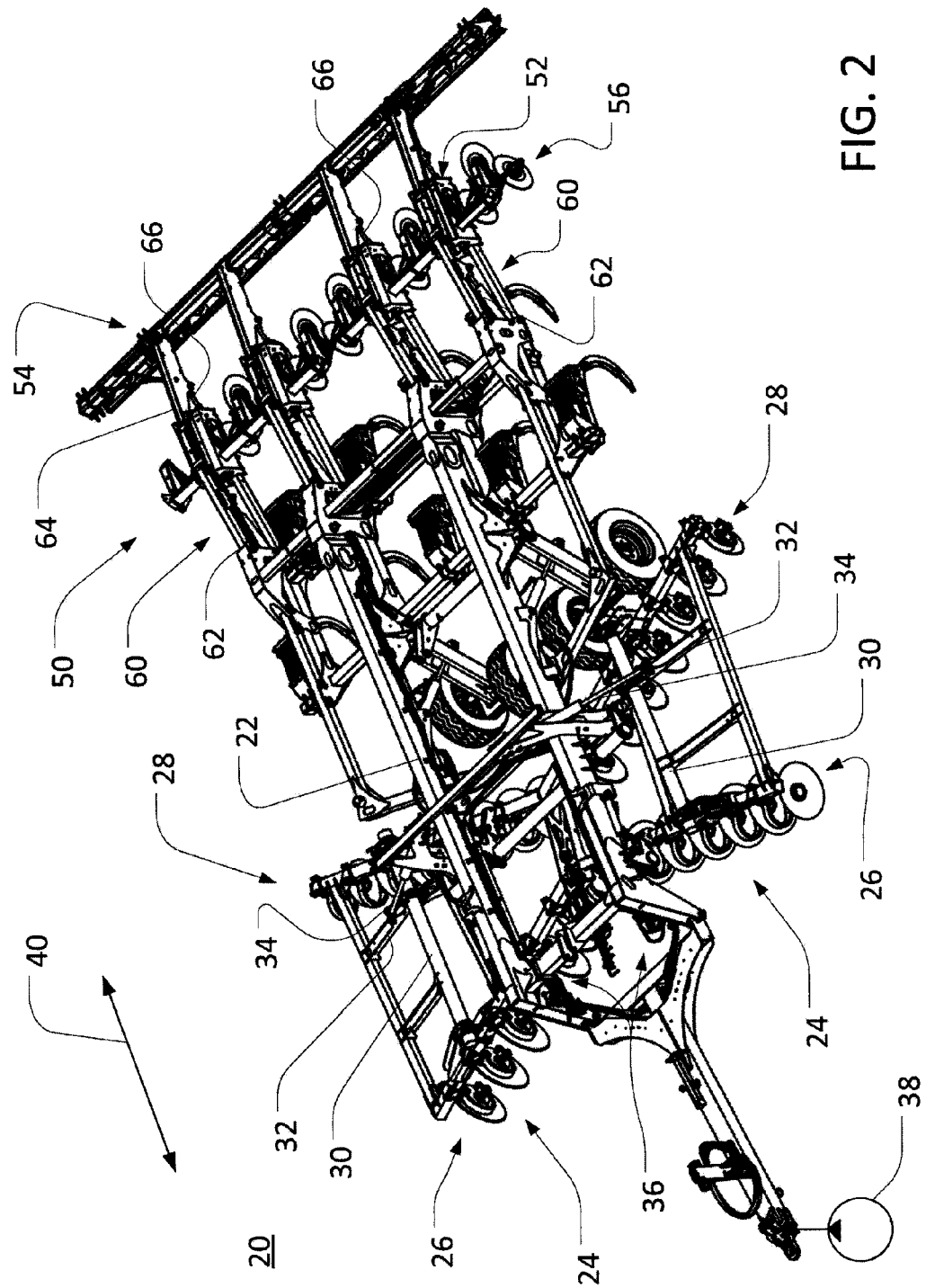
FIG. 2 is a perspective view of the agricultural implement of FIG. 1, configured as a combination ripper with rigid wings and a finishing attachment.

The system described herein may be implemented with respect to a variety of implements, including various agricultural or other work implements. In certain embodiments, the described system and method may be implemented with respect to a tillage or other soil-conditioning implement. Referring, for example, to FIGS. 1 and 2, an example tillage implement 20 is configured as a combination ripper having a main frame 22. The main frame 22 may be a rigid, metal frame, and may be constructed in various known ways. Tools of various configurations (e.g., various tillage tools such as rippers, mulching disks, finishing baskets, and so on) may be supported by the frame 22, such that when the implement 20 is towed in the forward direction (e.g., forward along a fore-to-aft reference line 40) by a work vehicle 42 (see FIG. 1) the tools condition the soil of a field.

In the embodiment depicted, a pair attachments configured as rigid wings 24 are provided to support various conditioning tools with respect to the frame 22. As depicted, each of the wings 24 supports gangs 26 and 28 of mulching disks, although other configurations (e.g., with other tools) may be possible. Various structural members, such as struts 32, may be included on the wings 24 to provide appropriate structural rigidity to the wings 24. These structural members may also provide attachment points for various control devices (e.g., various actuators), various tools, or other features. For example, as discussed in greater detail below, a hydraulic cylinder 34 (or other pressurized fluid actuator) may be attached to each of the struts 32, in order to move the wings 24.

Also as depicted, each of the wings 24 is supported with respect to the main frame 22 by a pivot tube 30, such that the wings 24 may be pivoted upward about the pivot tube 30 (e.g., for transport to and from a field) and downward about the pivot tube 30 (e.g., to engage the ground for a tillage operation). It will be understood that other configurations may also be possible, including the use of structures or devices other than the pivot tubes 30 to pivotally attach the wings 24 to the frame 22.

In certain embodiments, a pressurized fluid system may be utilized to control down pressure on the wings 24 and the movement of the wings 24 (or similar attachments) with respect to the pivot tubes 30, as well as to control various other aspects of the operation of the implement 20. In certain embodiments, a pressurized fluid system for the implement 20 (or other implements) may be configured as a hydraulic system (e.g., as a hydraulic system 36, as in FIG. 2), with various hydraulic lines, hydraulic pumps, hydraulic actuators, hydraulic valve assemblies, and so on. In certain embodiments, other pressurized fluid systems may alternatively (or additionally) be utilized. For example, a pneumatic system, with various pneumatic lines, pressure sources (e.g., air bags), pneumatic actuators, pneumatic valve assemblies, and so on, may be utilized in place of the hydraulic system 36.

Figure 3:
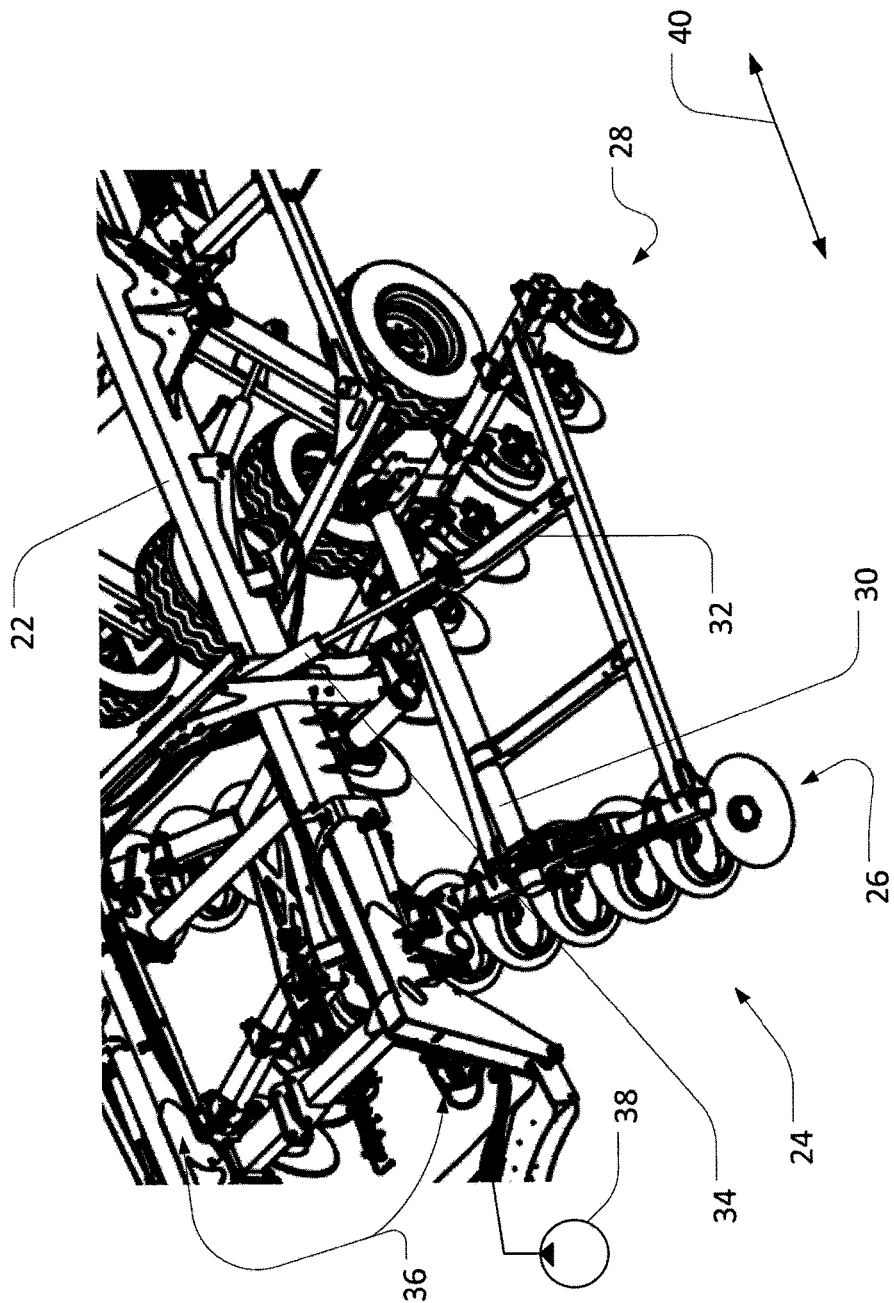
FIG. 3 is an enlarged perspective view of the agricultural implement of FIG. 1, including a portion of one of the rigid wings, from a similar perspective as FIG. 2.

As also noted above, a pressurized fluid actuator (e.g., a hydraulic or pneumatic cylinder) may be utilized to apply raising or lowering force to the wings 24 (or other attachments or features of an agricultural implement). For example, referring also to the enlarged view of the implement 20 in FIG. 3, a hydraulic cylinder 34 for each of the wings 24 is mounted to the main frame 22 of the implement 20 at one end of the cylinder 34, and is mounted to one of the struts 32 of the relevant wing 24 at the other end of the cylinder 34. (It will be understood that other configurations may be possible, including configurations with different attachment points for the cylinders 34 or configurations of the cylinders 34.) A hydraulic pump 38 (e.g., as carried by the work vehicle 42 (see FIG. 1)) is configured to provide working pressure to the hydraulic cylinders 34 via the hydraulic circuit 36. In this way, the operation of the cylinders 34, and thereby the orientation of and down pressure on the wings 24, may be hydraulically controlled. As depicted, a single hydraulic circuit 36 supplies working pressure to each cylinder 34 of the implement 20, as well as various other components of the implement 20 (e.g., other hydraulic actuators). It will be understood, however, that multiple circuits (not shown) may be utilized in other embodiments.

As also noted above, in certain embodiments, the hydraulic circuit 36 and related components depicted in the various figures may be replaced with generally similar pneumatic components, such that pneumatic (rather than hydraulic) pressure may be utilized by the implement 20. For example, a pneumatic bag (not shown) may be utilized in place of the hydraulic pump 38, a pneumatic circuit (not shown) may be utilized in place of the hydraulic circuit 36, and pneumatic cylinders (not shown) may be utilized in place of the hydraulic cylinders 34. Likewise, other pneumatic components and systems may be used in place of various other hydraulic (or other pressurized-fluid) components and systems discussed throughout this disclosure. In certain embodiments, a pneumatic circuit may utilize similarly configured flow lines, valves, actuators, and so on as are utilized by the hydraulic circuit 36, but with the various devices configured to route and regulate pressurized air, rather than hydraulic fluid.

In certain embodiments, a pneumatic system may be configured to vent pressure to the surroundings, rather than to an on-board fluid reservoir. This may be useful, for example, in order to facilitate separate control of down pressure (or other factors) at various different sections of a particular attachment (e.g., left, right, and center sections of a finishing attachment), without the need for significant expenditure on additional valves or controls.

Figure 4:
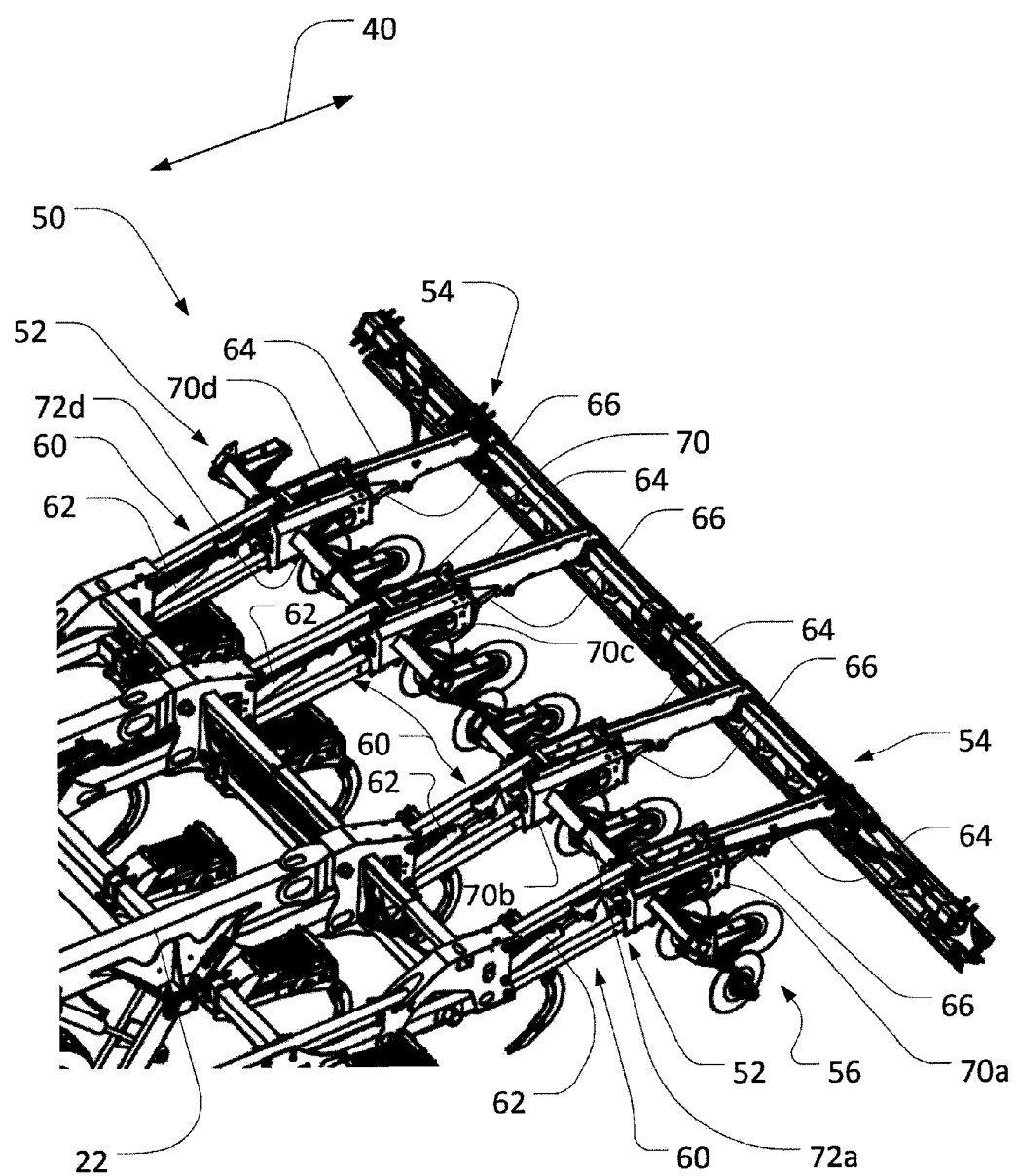
FIG. 4 is an enlarged perspective view of the agricultural implement of FIG. 1, including a portion of the finishing attachment, from a similar perspective as FIG. 2.

In the embodiment depicted, referring also to FIG. 4, the implement 20 also includes a trailing attachment 50 attached at a rear portion of the frame 22 of the implement 20. A trailing attachment may be generally regarded as an attachment that trails behind a support structure of the implement 20 (or another similar implement) during forward travel of the implement 20. Generally, trailing attachments may not be independently powered for forward travel, such that the trailing attachments are towed in the forward direction for operation (e.g., by the associated implement). Other configurations may be possible, however.

As depicted, the attachment 50 is disposed at the rear of the frame 22 (and the implement 20). Other configurations may be possible, however. For example, a trailing attachment may be attached to the frame 22 at a side portion of the frame 22, such that the attachment trails behind the point of attachment to the frame 22, but not necessarily behind the entire frame 22. Also as depicted, the attachment 50 supports various closing disk assemblies 56 as well as finishing baskets 58, and may accordingly be regarded as a finishing attachment. It will be understood, however, that other configurations may be utilized for a trailing attachment, including configurations with various tools not typically regarded as finishing tools.

To facilitate better soil conditioning, it may be useful to configure a trailing attachment with independently movable frame sections. In the embodiment depicted, for example, the finishing attachment 50 includes a leading frame 52 configured to support the closing disk assemblies 56 and a trailing frame 54 configured to support the finishing baskets 58. The leading frame 52 may be attached to the main frame 22 in various ways and the trailing frame 54 may be attached to the leading frame 52 in various ways, such that the trailing frame 54 receives motive force from the main frame 22 only via the leading frame 52.

Various attachment structures may be utilized to attach the leading frame 52 to the main frame 22. In certain embodiments, the leading frame 52 may be pivotally (or otherwise) attached to the frame 22 of the implement 20, such that the frame 52 (and the attachment 50 in general) trails behind the frame 22 as the implement 20 is towed in a forward direction over a field. As depicted, for example, the leading frame 52 is attached to the frame 22 with various parallel linkages 60, such that the frame 52 may move up and down with respect to the frame 22 without significantly changing the angular orientation of the closing disk assemblies with respect to the ground. It will be understood, however, that other configurations of attachment structures may be possible for attaching the frame 52 to the frame 22. For example, various drawbars or other struts (not shown) or other linkages (e.g., three-bar linkages) (not shown) may extend between the leading frame 52 and the frame 22, such that the leading frame 52 may pivot (or otherwise move) with respect to the frame 22.

In certain embodiments, a leading frame (or another frame of the implement 20 or an attachment thereto) may include various structural sub-units. As depicted, for example, the leading frame 52 includes a number of leading support frames 70 (e.g., support frames 70a-d), to which the various linkages 60 are attached and on which the various closing disk assemblies 56 are mounted. Various cross beams 72 (e.g., beams 72a and 72b), or other structural members or assemblies, extend between the various support frames 70, in order to connect the support frames 70. In certain embodiments, the cross beams 72 may provide a rigid connection between the associated support frames 70, such that movement of one of the frames 70 may be transmitted via the relevant cross beam 72 to another of the frames 70. In certain embodiments, including the embodiment depicted, cross beams 72 (or similar structures) may connect only certain of the support frames 70, such that movement of a particular support frame 70 (or set of support frames 70) may not be transmitted to certain other support frames 70 by any of the cross beams 72. For example, the support frames 70a and 70b may be connected by the cross beam 72a, and the support frames 70c and 70d may be connected by the cross beam 72d, but support frames 70b and 70c may not be connected by a cross beam. This may, for example, facilitate coordinated between the support frames 70a and 70b, and between the support frames 70c and 70d, while allowing the pairs of frames 70a and 70b, and 70c and 70d, to collectively move relatively independently of each other.

In order to control the orientation of the leading frame 52, and thereby the down pressure at the tools supported by the leading frame 52, various pressurized fluid actuators (e.g., hydraulic cylinders) may extend between the frame 22 and the leading frame 52. As depicted, for example, hydraulic cylinders 62 are attached to the frame 22 and to one or more members of the linkages 60 such that extending the cylinders 62 lifts the frame 52 (or portions thereof) with respect to the frame 22. As discussed in greater detail below, the cylinders 62 may be included in the hydraulic circuit 36 (or another pressurized fluid circuit), such that pressurized flow from the pump 38 (or another pressure source) may be utilized to actuate the cylinders 62. In certain embodiments, the cylinders 62 may be alternatively configured such that retraction of the cylinders 62 lifts the frame 52 (or portions thereof).

Various attachment structures may also be utilized to attach the trailing frame 54 to the leading frame 52 (and, thereby, to the main frame 22). In certain embodiments, the trailing frame 54 may be pivotally (or otherwise) attached to the leading frame 52 of the finishing attachment 50, such that the trailing frame 54 trails behind the leading frame 52 as the implement 20 is towed over the field. In this way, the trailing frame 54 may be configured to be movably supported by the frame 22, but only via the leading frame 52. As depicted, for example, the trailing frame 54 is attached to the leading frame 52 with various single-strut drawbars 64, such that the various finishing baskets 58 may pivot with respect to the leading frame 52. It will be understood, however, that other configurations of attachment structures may be possible for attaching the frame 54 to the frame 52. For example, various parallel or three-bar linkages (not shown) may be utilized to attach the trailing frame 54 to the leading frame 52.

In order to control the orientation of the trailing frame 54, and thereby the down pressure at the tools supported by the trailing frame 54, various pressurized fluid actuators (e.g., hydraulic cylinders) may extend between the forward and trailing frames 52 and 54. As depicted, for example, hydraulic cylinders 66 are attached to the leading frame 52 and the drawbars 64, such that the cylinders 66 may be utilized to control the orientation of the trailing frame 54 with respect to the leading frame 52. As discussed in greater detail below, the cylinders 66 may be included in the hydraulic circuit 36 (or another pressurized fluid circuit), such that pressurized flow from the pump 38 (or another pressure source) may be utilized to actuate the cylinders 66. As depicted, the cylinders 66 may be configured such that extending the cylinders 66 lifts the frame 54 (or portions thereof). In certain embodiments, the cylinders 66 may be alternatively configured such that retraction of the cylinders 66 lifts the frame 54 (or portions thereof)

The depicted stepped (or tiered) configuration of the finishing attachment 50, in which the trailing frame 54 is attached to the main frame 22 of the implement 20 via the leading frame 52, may be useful in various ways. For example, because the leading and trailing frames 52 and 54 may move relatively independently of each other (e.g., via the pivoting of the drawbars 64), the closing disk assemblies 56 and the finishing baskets 58 may also move relatively independently of each other. This may result in more consistent and effective conditioning of the soil by both sets of tools. For example, where the closing disk assemblies 56 encounter an obstacle in the field, the pivoting of the drawbars 64 (or the movement of an alternative attachment structure) may allow the closing disk assemblies 56 to move over the obstacle without also excessively raising the finishing baskets 58 off of the ground. Likewise, where the finishing baskets 58 encounter an obstacle, the pivoting of the drawbars 64 (or the movement of an alternative attachment structure) may allow the finishing baskets 58 to move over the obstacle without also excessively raising the closing disk assemblies 56 away from the ground.

Further, because the leading and trailing frames 52 and 54 may move relatively independently of each other, various control systems may be provided for separately (or jointly) controlling the down pressure (or other forces) applied to (or by) the tools supported, respectively, by the two frames 52 and 54. For example, as noted above, various actuators (e.g., the hydraulic cylinders 62 and 64) may be provided to control movement of the frames 52 and 54. Because the frames 52 and 54 may move independently of each other, the cylinders 62 and 64 may be independently controlled in order to selectively move one (or both) of the frames 52 and 54. As such, for example, a particular down pressure strategy may be applied for the closing disk assemblies 56 (or other tools) attached to the leading frame 52 and a different down pressure strategy may be applied for the finishing baskets 58 (or other tools) attached to the trailing frame 54. Moreover, because the trailing frame 54 is attached to the main frame 22 via the leading frame 52, the orientation of the trailing frame 54 may also be controlled indirectly, by controlling the orientation of the leading frame 52. As such, for example, down pressure at the trailing frame 54 may be controlled, at least in part, by actuating the cylinders 62 to move (or otherwise apply force to) the leading frame 52.

Figure 5:
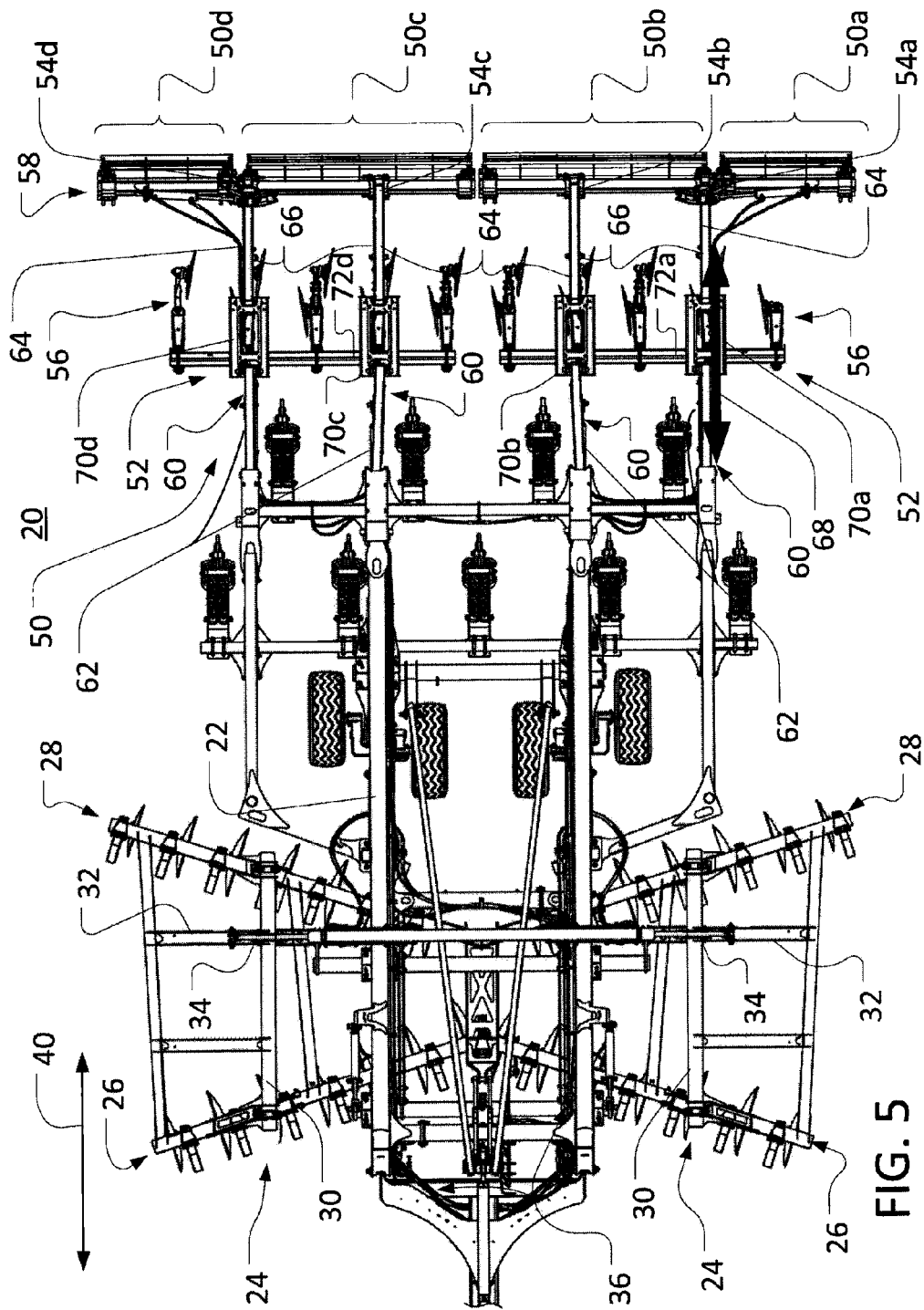
FIG. 5 is a top view of the agricultural implement of FIG. 1.

In certain embodiments, a leading frame of a trailing attachment may be attached to a trailing frame of a trailing attachment with structures that extend along the forward direction of motion of the relevant implement (e.g., as viewed from above). For example, as can be seen in FIG. 5 in particular, the linkages 60 for attaching the leading frame 52 of the finishing attachment 50 generally extend in parallel with the fore-to-aft line 40 for the implement 20. Similarly, the drawbars 64 for attaching the trailing frame 52 of the may also generally extend along the fore-to-aft line 40. This may result in relatively efficient transmission of towing force from the frame 22 through the linkages 60 to the leading frame 52 (e.g., at the various support frames 70), and from the leading frame 52 (e.g., at the various support frames 70) through the drawbars 64 to the trailing frame 54.

Further, in certain embodiments, a leading frame of a trailing attachment may be attached to a trailing frame of a trailing attachment with structures that are generally aligned with each other, with respect to the forward direction of travel for the relevant implement (e.g., as viewed from above). In the embodiment depicted, for example, the linkages 60 are generally aligned with the drawbars 64 such that a line that extends along a particular drawbar 64 in parallel with the fore-to-aft line 40 also extends along a corresponding linkage 60 in the same direction. For example, it can be seen in FIG. 5 that a single reference line 68 may be extended in parallel with the fore-to-aft line 40 along one of the linkages 60 and along one of the drawbar 64. This aligned configuration of attachment structures may also result in relatively efficient transmission of towing force from the frame 22 through the leading frame 52 to the trailing frame 54. Additionally, such an alignment of attachment structures may reduce the need for additional attachment structures (e.g., for a drawbar extending from the trailing frame 54 all the way to the main frame 22), while improving the ease of adding actuators to control down force (or other factors) for either of the frames 52 or 54.

In certain embodiments, multiple similar attachments may be provided for the implement 20, or a particular attachment may be divided into various independent (or semi-independent) sections. Still referring to FIG. 5, for example, the finishing attachment 50 may be viewed as including multiple sections 50a, 50b, 50c, and 50d (or another number of sections) or, alternatively, as including multiple distinct attachments 50a, 50b, 50c, and 50d. As such, the leading frame 52 includes various frame sections 52a, 52b, 52c, and 52d (or another number of sections). In the embodiment depicted, attachment sections 50a and 50b are connected near the finishing baskets 58, as are the attachment sections 50c and 50d. In certain embodiments, this connection may be a pivotal (or other movable) connection, such that the finishing baskets 58 of sections 50a and 50b (or sections 50c and 50d) may be moved somewhat independently from each other. This may be useful, for example, to allow the laterally outermost baskets 58 (i.e., at the sections 50a and 50d) to be pivoted upward for transport or other operations. Alternatively (or additionally), in certain embodiments, a rigid or other connection type, or no connection, may be used.

In certain embodiments, the distinct attachment (or attachment sections) 50a-d may include, respectively, the support frames 70a-d of the leading frame 52 (or other portions or sections of the frame 52), with each of the support frames 70a-d (or a subset thereof) being configured to move relatively independently of the other support frames 70a-d. This may, for example, allow certain of the closing disk assemblies 56 to move relatively independently of other closing disk assemblies 56. Similarly, in the embodiment depicted, the trailing frame 54 may include various frame sections 54a, 54b, 54c, and 54d (or another number of sections). Each of the frame sections 54a-d (or a subset thereof), may also be configured to move relatively independently of the other frame sections 54a-d, which may allow certain of the finishing baskets 58 to move relatively independently of others of the finishing baskets 58.

In certain embodiments, a single pressurized fluid circuit (e.g., the hydraulic circuit 36) may be utilized to control each section (or sub-frame) of the leading and trailing frames 52 and 54 of the finishing attachment 50 (e.g., to control each of the various frames 70a-d or frame sections 54a-d, and so on). In certain embodiments, multiple pressurized fluid circuits may be utilized, with each of the various frames and frame sections of the attachment 50 (or various subsets thereof) being controlled separately. In such a configuration, for example, pneumatic systems may be usefully employed, as the ability to vent the pneumatic to atmosphere may allow relatively low-cost implementation of multiple control pressures (or other control factors).

As noted above, it may be useful to control the force applied by various actuators to various attachments for the implement 20 (or another implement). Among other benefits, for example, this may facilitate maintaining appropriate down pressure at various soil-conditioning tools. In certain embodiments, a hydraulic (or other) control assembly may be included in the hydraulic (or other) circuit 36, in order to regulate the down pressure applied at the rigid wings 24. For example, a pressurized fluid system may be configured to provide constant pressurization for the cylinders 34 (or other actuators) whenever a pressure source is engaged (e.g., whenever a hydraulic pump is energized). This may be accomplished, for example, through an open-center control valve or other control devices. By maintaining the pressure provided to the cylinders 34 at a particular level, a relatively constant down pressure may accordingly be provided at the wings 24. In this way, even if the weight of the wings 24 is relatively low, appropriate engagement may be maintained between the tools supported by the wings 24 (e.g., the disk gangs 26 and 28) and the ground.

Figure 6:
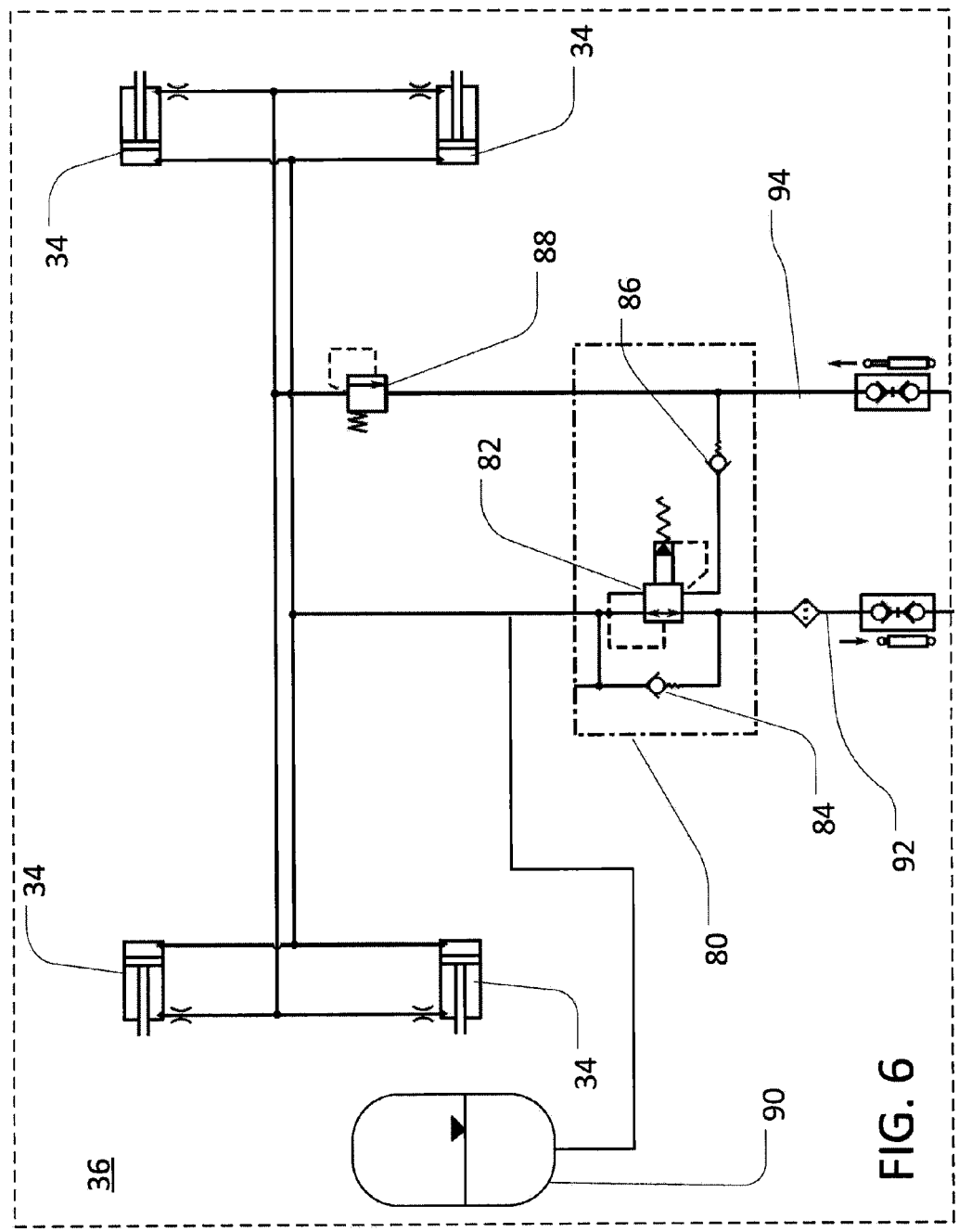
FIG. 6 is a schematic view of a hydraulic circuit for control of down pressure at the rigid wings of the agricultural implement of FIG. 1.

Referring also to FIG. 6, in an example embodiment, pressurized hydraulic (or other) fluid may be provided (e.g., from the pump 38 (not shown in FIG. 6)) via the flow line 92 to a pressure control valve assembly 80, which may be configured to regulate the pressurized flow to maintain a relatively constant pressure for the various cylinders 34. In the embodiment depicted, the valve assembly 80 includes a pressure control valve 82 disposed between the flow line 92 and the base ends of the various cylinders 34. The valve 82 is arranged in parallel with a bypass valve 84 that is configured to allow drainage of the base ends of the cylinders 34 to the flow line 92, and in series with another bypass valve 86 that is configured to allow return flow of fluid from the valve 82 to a flow line 94. The valve 82 is depicted as a pilot operated pressure control valve, which may be set to various pressure control points (e.g., between 1350 psi and 1550 psi). In this way, as long as sufficiently pressurized fluid is provided via the flow line 92, the valve assembly 80 may ensure that a relatively constant pressure may be maintained at the base end of the cylinders 34. In this way, a relatively constant down pressure may be maintained on the wings 24 and the associated disk gangs 26 and 28.

It will be understood that other configurations of the valve 82, of the valves 84 and 86, and of other fluid control devices (not shown) may be possible. A thermal relief valve 88 may also be provided, between the flow line 94 and the rod ends of the various cylinders 34.

In certain embodiments, an accumulator may alternatively (or additionally) be provided, in order to maintain a relatively constant pressure at the cylinders 34. For example, as depicted in FIG. 6, a hydraulic accumulator 90 may be disposed in hydraulic communication with the base ends of the various cylinder 34. In this way, a relatively constant down pressure may be maintained at the wings 24 even if pressurized fluid is not continuously provided at the flow line 92.

As also noted above, in certain embodiments, other pressurized fluid systems may be utilized to similarly ensure appropriate down pressure at the wings 24. For example, as an alternative to the hydraulic valve assembly 80 and related devices, various pneumatic valve assemblies (not shown) may be configured to regulate pressure from a pneumatic pressure source (not shown) in order to provide relatively constant pressurization of the cylinders 34. In certain embodiments, such a pneumatic system may facilitate different control for different portions of the relevant fluid system. For example, because pressurized air may often be vented to atmosphere (rather than relieved to a tank), it may be relatively simple to arrange for separate pressurization and pressure control for each of the various cylinders 34 (or for various other actuators). This may be useful, for example, where particularly wide configuration of the wings 24 (or other structures) are utilized, such that it may be useful to apply different down pressures to different sections of the wings 24 (or other structures). (It will be understood that separate control of the various sections of the wings 24, or other structures, may also be implemented with hydraulic or other pressurized fluid systems.)

In certain embodiments, a hydraulic (or other) control assembly may also be included in the hydraulic (or other) circuit 36, in order to regulate the down pressure on the trailing attachment 50 (or various portions thereof). For example, a pressurized fluid system may be configured to provide constant pressurization for the cylinders 62 (or other actuators) whenever a pressure source is engaged (e.g., whenever a hydraulic pump is energized). In certain embodiments, a constant supply of pressurized fluid may be provided, at least in part, through the use of an open-center control valve or other control devices. A control assembly (e.g., a control valve assembly) may then be utilized to regulate the received pressurized fluid in order to maintain appropriate pressures at appropriate devices. By maintaining the pressure provided to the cylinders 62 at a particular level, for example, a relatively constant down pressure may accordingly be provided to the leading frame 52. In this way, even if the weight of the trailing attachment 50 is relatively low, appropriate engagement may be maintained between the tools supported by the attachment 50 (e.g., the closing disk assemblies 56) and the ground.

Figure 7:
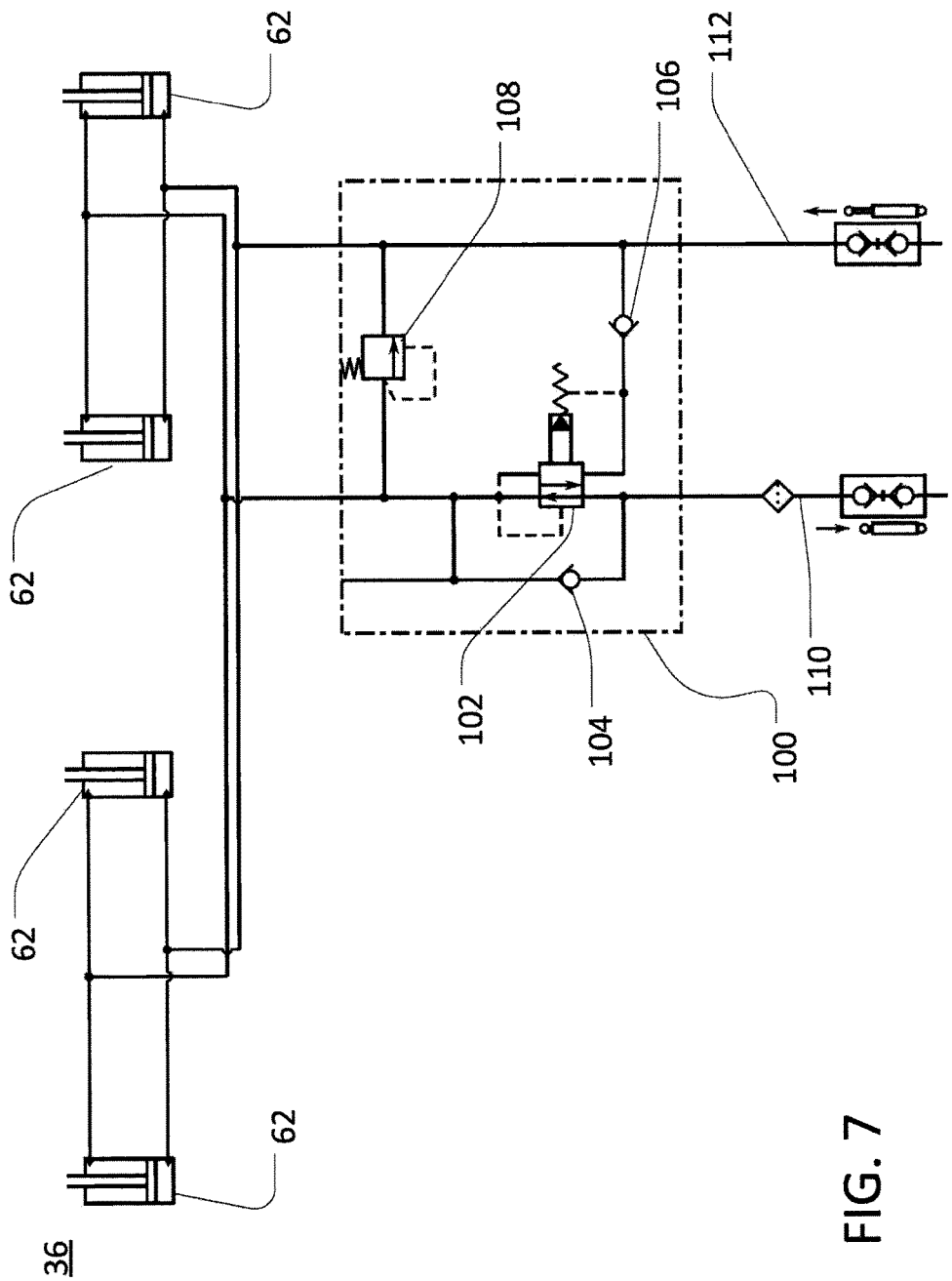
FIG. 7 is a schematic view of a hydraulic circuit for control of down pressure at the finishing assembly of the agricultural implement of FIG. 1.

Referring also to FIG. 7, for example, pressurized hydraulic (or other) fluid may be provided (e.g., from the pump 38 (not shown in FIG. 7)) via the flow line 110 to a pressure control valve assembly 100, which may be configured to regulate the pressurized flow to maintain a relatively constant pressure at the various cylinders 62 (or other cylinders). In the embodiment depicted, the valve assembly 100 includes a pressure control valve 102 disposed between the flow line 110 and the rod ends of the various cylinders 62. The valve 102 is arranged in parallel with a check valve 104 that is configured to allow drainage of the rod ends of the cylinders 34 to the flow line 110, and in series with another check valve 106 that is configured to allow return flow of fluid from the valve 102 to a flow line 112. The valve 102 is depicted as a pilot operated pressure control valve, which may be set to various pressure control points (e.g., between 900 psi and 1000 psi). In this way, as long as sufficiently pressurized fluid is provided via the flow line 110, the valve assembly 100 may ensure that a relatively constant pressure may be maintained at the rod end of the cylinders 62. In this way, a relatively constant down pressure may be maintained on the leading frame 52 and the associated closing disk assemblies 56.

The valve assembly 100 may also include a pressure relief valve 108 disposed between the rod and piston ends of the various cylinders 62. This may provide useful system protection, for example, when pressurized fluid is not being supplied via the flow line 110. For example, if no pressurized fluid is being provided via the flow line 110, and a ground impact on the trailing attachment 50 causes the cylinders 62 to extend, fluid pressure at the rod ends of the cylinders 62 may increase. Before this pressure increase can have significant adverse effects, however, the pressure imbalance may be relieved by porting fluid from the rod ends of the cylinders 62 to the base ends of the cylinders 62 via the valve 108. Generally, the relief valve 108 may be set to a higher pressure control point than the pressure control valve 102 (e.g., 1400 to 1600 psi), such that flow through the valve 102 does not trigger the valve 108.

It will be understood that other configurations of the valve 102, of the valves 104 and 106, of the valve 108, and of other fluid control devices (not shown) may be possible. Further, a valve assembly configured similarly to the valve assembly 100 may be utilized, in certain embodiments, to similarly regulate pressure for the cylinders 66 (not shown in FIG. 7), and thereby regulate down pressure specifically for the trailing frame 54 and the associated finishing baskets 58.

As also noted above, in certain embodiments, other pressurized fluid systems may be utilized to similarly ensure appropriate down pressure at the trailing attachment 50. For example, as an alternative to the hydraulic valve assembly 100 and related devices, various pneumatic valve assemblies (not shown) may be configured to regulate pressure from a pneumatic pressure source (not shown) in order to provide relatively constant pressurization of the cylinders 62 (or the cylinders 66). In certain embodiments, such a pneumatic system may facilitate different control for different portions of the relevant fluid system. For example, because pressurized air may often be vented to atmosphere (rather than relieved to a tank), it may be relatively simple to arrange for separate pressurization and pressure control for each of the various cylinders 62, for various sets of the cylinders 62, or for various other actuators. This may be useful, for example, where a particularly configuration of the attachment 50 (or other structures) are utilized, such that it may be useful to apply different down pressures to different sections of the attachment 50 (or other structures). For example, different down-pressure control strategies (e.g., different set pressures) may be utilized for each of the various sections 50a, 50b, 50c, and 50d of the attachment 50 (see FIG. 5). (It will be understood that separate control of the various sections 50a through 50d, or other sections, may also be implemented with hydraulic or other pressurized fluid systems.)

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An agricultural implement comprising:
   an implement frame;
   a trailing attachment configured to be towed by the implement frame; and
   a rigid wing pivotally mounted to the implement frame, the rigid wing supporting a third set of agricultural tools;
   a pressurized fluid circuit configured to provide lifting or lowering force to the trailing attachment and the rigid wing;
   wherein the trailing attachment includes:
      a leading frame supporting a first set of agricultural tools; and
      a trailing frame supporting a second set of agricultural tools;
      wherein the leading frame and the trailing frame are configured to move, at least in part, independently of each other;
   wherein the leading frame is mounted to the implement frame with a first attachment structure, the first attachment structure permitting vertical movement of the leading frame relative to the implement frame;
   wherein the trailing frame is mounted to the leading frame with a second attachment structure, such that the trailing frame is mounted to the implement frame via the leading frame, the second attachment structure permitting vertical movement of the trailing frame relative to the leading frame and the implement frame;
   wherein, as viewed from above, the first attachment structure and the second attachment structure extend along a common line in the fore-to-aft direction with respect to the agricultural implement;
   wherein the pressurized fluid circuit includes
      a wing cylinder mounted at a first end to the rigid wing and mounted at a second end to the implement frame;
      a pressure source in fluid communication with the wing cylinder via an inlet flow line; and
      a pressure control assembly disposed between the pressure source and the wing cylinder;
   wherein the pressure source is configured to provide continuous flow of pressurized fluid to the pressure control assembly during operation of the implement; and the pressure control assembly is configured to maintain a substantially constant pressure at the wing cylinder such that substantially constant down pressure is provided at the rigid wing during operation of the implement;
   wherein the pressure control assembly includes a pressure control valve disposed on the inlet flow line between the pressure source and the wing cylinder, a first one way valve in parallel with the pressure control valve between the pressure source and the wing cylinder, a second one-way valve in series with the pressure control valve between the wing cylinder and an outlet flow line, and a hydraulic accumulator connected to the inlet flow line between the pressure control valve and the wing cylinder, the second one-way valve allowing flow from the pressure control valve to the outlet flow line and blocking flow from the outlet flow line to the pressure control valve.

2. The agricultural implement of claim 1, wherein the first set of agricultural tools includes one or more closing disk assemblies.

3. The agricultural implement of claim 1, wherein the second set of agricultural tools includes one or more finishing baskets.

4. An agricultural implement comprising:
   an implement frame;
   a trailing attachment configured to be towed by the implement frame, the trailing attachment comprising a leading frame, a trailing frame, a first attachment structure and a second attachment structure; the leading frame supporting a first set of agricultural tools, the trailing frame supporting a second set of agricultural tools, the leading frame being mounted to the implement frame with the first attachment structure, and the trailing frame being mounted to the leading frame with the second attachment structure such that the trailing frame is mounted to the implement frame via the leading frame;
   a rigid wing pivotally mounted to the implement frame, the rigid wing supporting a third set of agricultural tools;
   a pressurized fluid circuit configured to provide lifting or lowering force to the trailing attachment, the pressurized fluid circuit comprising a pressure source, a trailing attachment pressure control assembly, and a trailing attachment cylinder having a first end and a second end; the pressure source being in fluid communication with the trailing attachment cylinder, and being configured to provide continuous flow of pressurized fluid during operation of the implement; the trailing attachment pressure control assembly being disposed between the pressure source and the trailing attachment cylinder, and being configured to maintain generally constant pressure at the trailing attachment cylinder such that generally constant down pressure is provided at one of the leading frame and the trailing frame during operation of the implement;
   the pressurized fluid circuit further comprising a wing cylinder mounted at a first end to the rigid wing and mounted at a second end to the implement frame; and a wing pressure control assembly disposed between the pressure source and the wing cylinder;
   wherein the first end of the trailing attachment cylinder is mounted to one of the implement frame and the leading frame, if the first end of the trailing attachment cylinder is mounted to the implement frame then the second end of the trailing attachment cylinder is mounted to one of the first attachment structure and the leading frame, and if the first end of the trailing attachment cylinder is mounted to the leading frame then the second end of the trailing attachment cylinder is mounted to one of the second attachment structure and the trailing frame;
   wherein the leading frame and the trailing frame are configured to move, at least in part, independently of each other, the first attachment structure permitting vertical movement of the leading frame relative to the implement frame, and the second attachment structure permitting vertical movement of the trailing frame relative to the leading frame and the implement frame;
   wherein the trailing attachment pressure control assembly includes a trailing attachment pressure control valve, a trailing attachment pressure relief valve, a first trailing attachment one-way valve and a second trailing attachment one-way valve; the trailing attachment pressure control valve being disposed in parallel with the first trailing attachment one-way valve between the pressure source and the trailing attachment cylinder, and being disposed in series with the second trailing attachment one-way valve between the trailing attachment cylinder and a trailing attachment outlet flow line, the second trailing attachment one-way valve allowing flow from the trailing attachment pressure control valve to the trailing attachment outlet flow line and blocking flow from the trailing attachment outlet flow line to the trailing attachment pressure control valve; the trailing attachment pressure relief valve being disposed between a rod end of the trailing attachment cylinder and a base end of the trailing attachment cylinder; the trailing attachment pressure relief valve being configured to release pressure from the rod end to the base end of the trailing attachment cylinder when fluid pressure at the rod end exceeds a predetermined trailing attachment threshold;

wherein the pressure source is configured to provide continuous flow of pressurized fluid to the wing pressure control assembly during operation of the implement, and the wing pressure control assembly is configured to maintain generally constant pressure at the wing cylinder such that generally constant down pressure is provided at the rigid wing during operation of the implement; and wherein the wing pressure control assembly includes a wing pressure control valve disposed on a wing inlet flow line between the pressure source and the wing cylinder, a first wing one way valve in parallel with the wing pressure control valve between the pressure source and the wing cylinder, a second wing one-way valve in series with the wing pressure control valve between the wing cylinder and a wing outlet flow line, and a hydraulic accumulator connected to the wing inlet flow line between the wing pressure control valve and the wing cylinder, the second wing one-way valve allowing flow from the wing pressure control valve to the wing outlet flow line and blocking flow from the wing outlet flow line to the wing pressure control valve.

5. The agricultural implement of claim 4, wherein, as viewed from above, the first attachment structure and the second attachment structure extend along a common line in a fore-to-aft direction with respect to the agricultural implement.

6. A soil-conditioning implement comprising:
an implement frame;
a leading frame supporting a first finishing device;
a leading linkage of one or more bars mounted at a first end to the leading frame and at a second end to the implement frame;
a leading cylinder mounted at a first end to the implement frame and at a second end to at least one of the leading linkage and the leading frame;
at least one pressurized fluid circuit configured to control the leading cylinder in order to move the leading frame with respect to the implement frame, the leading cylinder thereby applying down pressure at the first finishing device;
a trailing frame supporting a second finishing device; and
a trailing linkage of one or more bars mounted at a first end to the leading frame and at a second end to the trailing frame;
a rigid wing pivotally mounted to the implement frame, the rigid wing supporting a wing set of agricultural tools;
wherein the at least one pressurized fluid circuit comprises a pressure source in fluid communication with the leading cylinder, and a leading pressure control assembly disposed between the pressure source and the leading cylinder; the pressure source being configured to provide continuous flow of pressurized fluid to the leading pressure control assembly during operation of the implement; the leading pressure control assembly being configured to maintain generally constant pressure at the leading cylinder such that generally constant down pressure is provided at the leading frame; and the at least one pressurized fluid circuit further comprises a wing cylinder mounted at a first end to the rigid wing and mounted at a second end to the implement frame; and a wing pressure control assembly disposed between the pressure source and the wing cylinder;

wherein the leading pressure control assembly comprises a leading pressure control valve, a leading pressure relief valve, a first leading one-way valve and a second leading one-way valve; the leading pressure control valve being disposed in parallel with the first leading one-way valve between the pressure source and the leading cylinder, the leading pressure control valve being disposed in series with the second leading one-way valve between the leading cylinder and a leading outlet flow line, the second leading one-way valve allowing flow from the leading pressure control valve to the leading outlet flow line and blocking flow from the leading outlet flow line to the leading pressure control valve; the leading pressure relief valve being disposed between a rod end of the leading cylinder and a base end of the leading cylinder, the leading pressure relief valve being configured to release pressure from the rod end to the base end of the leading cylinder when fluid pressure at the rod end exceeds a predetermined leading threshold;

wherein the pressure source is further configured to provide continuous flow of pressurized fluid to the wing pressure control assembly during operation of the implement, and the wing pressure control assembly is configured to maintain generally constant pressure at the wing cylinder such that generally constant down pressure is provided at the rigid wing during operation of the implement; and wherein the wing pressure control assembly includes a wing pressure control valve disposed on a wing inlet flow line between the pressure source and the wing cylinder, a first wing one way valve in parallel with the wing pressure control valve between the pressure source and the wing cylinder, a second wing one-way valve in series with the wing pressure control valve between the wing cylinder and a wing outlet flow line, and a hydraulic accumulator connected to the wing inlet flow line between the wing pressure control valve and the wing cylinder, the second wing one-way valve allowing flow from the wing pressure control valve to the wing outlet flow line and blocking flow from the wing outlet flow line to the wing pressure control valve.

7. The soil-conditioning implement of claim 6, further comprising:
a trailing cylinder mounted at a first end to at least one of the trailing frame and the trailing linkage and at a second end to the leading frame;
wherein the at least one pressurized fluid circuit is further configured to control the trailing cylinder in order to move the trailing frame with respect to the leading frame, the trailing cylinder thereby applying down pressure at the second finishing device.

8. The soil-conditioning implement of claim 6, wherein, as viewed from above, the leading linkage and the trailing linkage are aligned with respect to a fore-to-aft direction of travel of the soil-conditioning implement, motive force from the implement frame being thereby transmitted from the implement frame to the trailing frame, via the leading linkage and trailing linkage, along a straight line.

9. The soil-conditioning implement of claim 6, wherein the first finishing device includes a closing disk assembly.

10. The soil-conditioning implement of claim 6, wherein the second finishing device includes a finishing basket.

11. The soil-conditioning implement of claim 7,
wherein the at least one pressurized fluid circuit comprises a trailing pressure control assembly disposed between the pressure source and the trailing cylinder; the pressure source being configured to provide continuous flow of pressurized fluid to the trailing pressure control assembly during operation of the implement; the trailing pressure control assembly being configured to maintain generally constant pressure at the trailing cylinder such that generally constant down pressure is provided at the trailing frame;
wherein the trailing pressure control assembly includes a trailing pressure relief valve disposed between a rod end of the trailing cylinder and a base end of the trailing cylinder; and
wherein the trailing pressure relief valve is configured to release pressure from the rod end to the base end of the trailing cylinder when fluid pressure at the rod end of the trailing cylinder exceeds a predetermined trailing threshold.

12. The soil-conditioning implement of claim 11, wherein the trailing pressure control assembly further comprises a trailing pressure control valve, a first trailing one-way valve and a second trailing one-way valve, the trailing pressure control valve being disposed in parallel with the first trailing one-way valve between the pressure source and the trailing cylinder, and the trailing pressure control valve also being disposed in series with the second trailing one-way valve between the trailing cylinder and the outlet flow line.

* * * * *